United States Patent

Gregg et al.

Patent Number: 6,108,675
Date of Patent: Aug. 22, 2000

[54] POSITIONING OF TRANSMITTED DOCUMENT PAGES IN RECEIVING DISPLAY STATION WINDOWS FOR MAXIMUM VISIBILITY OF INFORMATION ON PAGES

[75] Inventors: Leon Edward Gregg, Rochester, Minn.; William Jaaskelainen, Jr., Austin, Tex.

[73] Assignee: International Business Machines Corporation, Armonk, N.Y.

[21] Appl. No.: 09/010,774

[22] Filed: Jan. 22, 1998

[51] Int. Cl.[7] ..................................................... G06F 17/30
[52] U.S. Cl. .......................... 707/519; 707/526; 382/295; 345/340
[58] Field of Search ..................................... 345/340, 342, 345/434, 112, 127, 121, 116, 350, 341; 707/526, 521, 517, 519; 382/295, 119, 112

[56] References Cited

U.S. PATENT DOCUMENTS

| | | | |
|---|---|---|---|
| 4,777,481 | 10/1988 | Craver | 340/703 |
| 5,208,906 | 5/1993 | Morgan | 395/148 |
| 5,241,656 | 8/1993 | Loucks et al. | 345/345 |
| 5,289,205 | 2/1994 | Torres | 345/124 |
| 5,418,549 | 5/1995 | Anderson et al. | 345/145 |
| 5,513,342 | 4/1996 | Leong et al. | 345/340 |
| 5,526,480 | 6/1996 | Gibson | 395/154 |
| 5,530,455 | 6/1996 | Gillick et al. | 345/163 |
| 5,533,182 | 7/1996 | Bates et al. | 395/155 |
| 5,546,520 | 8/1996 | Cline et al. | 395/155 |
| 5,553,225 | 9/1996 | Perry | 395/157 |
| 5,559,946 | 9/1996 | Porter | 395/157 |
| 5,757,981 | 5/1998 | Kawakubo | 382/293 |
| 5,845,299 | 12/1998 | Arora et al. | 707/513 |
| 5,937,421 | 8/1999 | Petrov et al. | 707/526 |
| 5,966,136 | 10/1999 | Kurtz et al. | 345/434 |

OTHER PUBLICATIONS

Ian T. Young, "Sampling Density for Image Analysis", Pattern Recognition, Aug. 1996., Proceedings of the 13th Int. Conference, pp. 840–843 vol.2.

Zhou et al., "The Effects of Sampling Variation on Image Recognition Systems", Image Processing and its Applications, Jan. 1995, Fith International Conference, pp. 75–79.

*Primary Examiner*—John E. Breene
*Assistant Examiner*—Greta Robinson
*Attorney, Agent, or Firm*—Jerry B. Kraft; Jeffrey S. LaBaw

[57] ABSTRACT

A data processor controlled user interactive display system for displaying hypertext documents, each including a sequence of display screen pages including text and image information received over a communications network such as the World Wide Web by first determining the more significant page edge based upon the horizontal direction in which the natural language of the text is read. Visual information density at a sequence of horizontal positions in a medial direction with respect to said significant page edge is then sampled, and each sequential sample of said visual information is compared to a selected density level. As a result of this comparison, the visual information in the window is positioned with respect to a reference margin determined by a sample of said visual information attaining said selected density level.

29 Claims, 8 Drawing Sheets

POSITIONING OF TRANSMITTED DOCUMENT PAGES IN RECEIVING DISPLAY STATION WINDOWS FOR MAXIMUM VISIBILITY OF INFORMATION ON PAGES

TECHNICAL FIELD

The present invention relates to computer managed communication networks and particularly to ease of use interactive computer controlled display interfaces to networks. Specifically, it is related to maximizing the visibility of the information in document display screen pages transmitted to display stations in the networks.

BACKGROUND OF THE INVENTION

The 1990's decade has been marked by a societal technological revolution driven by the convergence of the data processing industry with the consumer electronics industry. Like all such revolutions, it unleashed a significant ripple effect of technological waves. The effect has, in turn, driven technologies which have been known and available but relatively quiescent over the years. A major one of these technologies is the internet-related distribution of documents, media and programs. The convergence of the electronic entertainment and consumer industries with data processing exponentially accelerated the demand for wide ranging communications distribution channels, and the World Wide Web or Internet which had quietly existed for over a generation as a loose academic and government data distribution facility reached "critical mass" and commenced a period of phenomenal expansion. With this expansion, businesses and consumers have direct access to all matter of documents, media and computer programs.

As a result of these changes it seems as if virtually all aspects of human endeavor in the industrialized world requires human-computer interfaces. Thus, there is a need to make computer directed activities accessible to a substantial portion of the world's population which, up to a year or two ago, was computer-illiterate, or, at best, computer indifferent. In order for the vast computer supported market places to continue and be commercially productive, it will be necessary for a large segment of computer indifferent consumers to be involved in computer interfaces. Thus, the challenge of our technology is to create interfaces to computers which are intuitive and forgive any impreciseness on the part of users. This is particularly needed with respect to the World Wide Web or internet. Users must be able to readily display documents in a clear and comprehensive manner in natural language. Hypertext Markup Language (HTML), which had been the documentation language of the internet World Wide Web for years, offered an answer. It offered direct links between pages and other documentation on the Web and a variety of related data sources which were, at first, text and then evolved into media, i.e. "hypermedia".

With all of these rapidly expanding functions of Web pages and like documentation, it should be readily understandable that the demand for Web documents has been expanding exponentially in recent years. In addition to the proliferating standard uses of HTML for text and media related World Wide Web pages for commercial, academic and entertainment purposes, there is now a Java documentation program, JavaDoc, which will produce standard HTML files for outputs to computer controlled displays to provide standard natural language displays of the program documentation. Thus, HTML has become the display language of choice for the Internet or World Wide Web. It is used there for all forms of display documentation including the markup of hypertext and hypermedia documents which are usually stored with their respective documents on an internet or Web server in addition to the above-mentioned program documentation functions. For further details on JavaDoc or HTML, reference may be made to the texts "Just Java", 2nd Edition, Peter van der Linden, Sun Microsystems, Inc., 1997; or "Java in a Nutshell", 2nd Edition, by David Flanagan, O'Reilly publisher, 1997.

With this rapid expansion of the Web, it is now possible for the Web browser or wanderer to spend literally hours going through document after document and accompanying media events in often less than productive excursions through the Web. These excursions often strain the user's time and resources. In order for the internet to mature from its great expectations to solid commercial fruition, it will be necessary for the internet to greatly reduce its drain on time and related resources. A significant source of this drain is in the Web page, the basic document page of the Web. In the case of Web pages, we do not have the situation of a relatively small group of professional designers working out the human factors; rather in the era of the Web, anyone and everyone can design a Web page. As a result, pages are frequently designed by developers without imaging or graphic skills. Which results in web pages that are often larger than the display windows or even screens on the user's receiving displays. This is particularly disrupting if the page is wider than the window since continual back and forth scrolling along the width of the page is required, and as the page usually contains text, such scrolling must be done line by line in order to read the text.

The present invention provides a solution to this problem by providing an implementation for positioning received pages in windows on receiving display stations so as to maximize the visibility of the information on the page.

SUMMARY OF THE INVENTION

The present invention relates to a computer controlled display system for displaying documents, and particularly for displaying Web pages and related documentation on receiving display workstations in a computer managed communication network. Users access these Web pages via a plurality of such data processor controlled interactive display stations receiving documents transmitted to said display stations from locations remote from said stations. Such documents include a sequence of at least one display screen page. With respect to each display page, means are provided at the receiving display station for determining the more significant of the two page edges. Since the page usually contains text, the significant edge will be dependent on whether the text is in a language which is read from left to right or from right to left. Means are then provided for sampling the page visual information density at a sequence of horizontal positions in a medial direction with respect to said significant page edge. Each sequential sample of said visual information is compared to a selected density level and, responsive to this comparison, the visual information in the window is positioned with respect to a reference margin as determined by a sample of the visual information maintaining said selected density level. Since Web pages are transmitted in digital form, the present invention may be effectively carried out by storing the received digital representations of the pages and sampling the stored digital data for said density samples. The invention may conveniently carried out by getting the width of the window from the display manager and calculating the distance by which the page width exceeds that of the window and setting the sequence of horizontal sampling positions at increments of said distance.

For the most effective results, the sampling of the information density is done along a plurality of horizontal lines, the comparison to the selected density level is done on each of the plurality of lines. Then the mean of the horizontal positions at which the density level is reached on the plurality of lines is calculated and this mean horizontal position is used as the reference margin. It should be understood that calculating the mean of the positions is intended to include calculating the median or mode positions as well as determining the average position.

When the present invention is applied to Web pages, such pages are customarily in a hypertext markup language such as HTML, which has a well known and developed format from which the parameters required to practice the invention such as page width, text line density levels and the text natural language (for significant edge purposes) may be readily obtained. As will be hereinafter described in greater detail, the sampling comparing and positioning steps which make up the invention may be incorporated into the Web browser associated with the receiving display station.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable. Reference has also been made to the applicability of the present invention to a global network such as the internet. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. A network may be as simple as two linked computers or it may be any combination of LANS (Local Area Networks) or WANS (Wide Area Networks). Of course, the Internet or World Wide Web is a global network of a heterogeneous mix of computer technologies and operating systems. Higher level objects are linked to the lower level objects in the hierarchy through a variety of network server computers. These network servers are the key to network distribution such as the distribution of Web pages and related documentation. The HTML language is described in detail in the above *Mastering the Internet* text, Cady et. al., as well as in the above-mentioned texts "Just Java", 2nd Edition, Peter van der Linden, Sun Microsystems, Inc., 1997; and "Java in a Nutshell", 2nd Edition, by David Flanagan, O'Reilly publisher, 1997. In addition, significant aspects of this invention will involve Web browsers. A general and comprehensive description of browsers may be found in the above-mentioned Cady et al. text at pp. 291–313.

Figure 1:
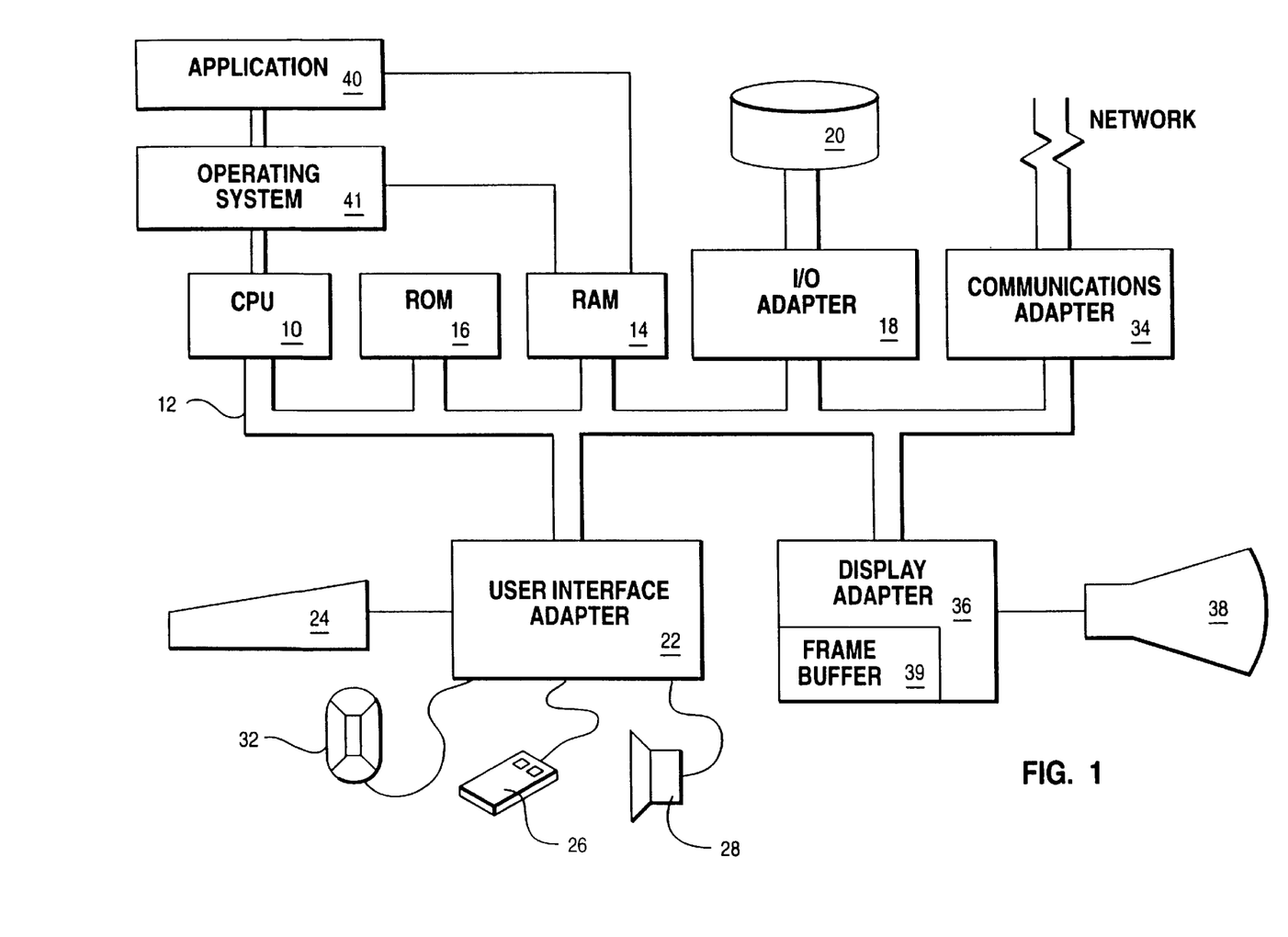
FIG. 1 is a block diagram of a data processing system including a central processing unit and network connections via a communications adapter which is capable of implementing a user interactive workstation on which the received data may be converted into a Web page in accordance with the present invention.

Referring to FIG. 1, a typical data processing system is shown which may be used in implementing the present invention on the receiving interactive workstation. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation) or the Windows95 system (a trademark of and available from Microsoft Corporation). Any conventional network browser forms part of application 40, runs in conjunction with operating system 41 and provides output calls to the operating system 41 which implements the various functions to be performed by application software 40. Also included in the application software 40 is the application of this invention for positioning received Web pages to be subsequently described in detail. The browser program operates in combination with the program of the present invention or the program of this invention could desirably be incorporated into the browser program.

The browser program, in combination with the operating system, provides the basic receiving workstation on which the Web pages are received and on which the page positioning in window procedure of the present invention may be implemented. A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the browser and page positioning applications 40 are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the workstation to communicate with Web servers to receive document pages over a local area network (LAN) or wide area network (WAN) which includes, of course, the internet or World Wide Web. I/O devices are also connected to system bus 12 via user interface adapter 22 and display adapter 36. Keyboard 24, trackball 32 and mouse 26 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and other information to the system through the trackball 32 or mouse 26 to make his preselections of file types to be and not to be transmitted from the server and for receiving the transmitted file types and other output information from the system via display 38.

Figure 2:
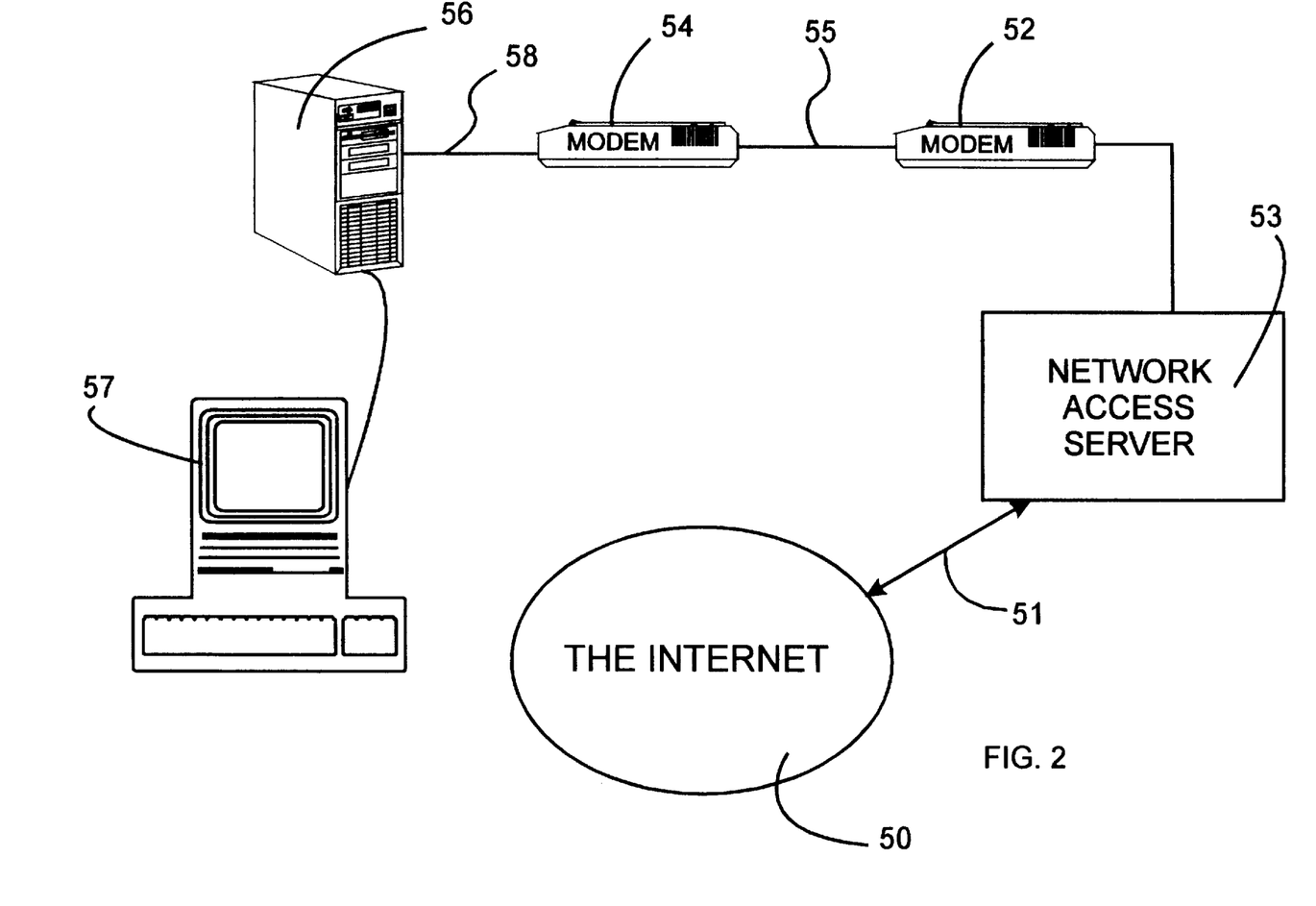
FIG. 2 is a generalized diagrammatic view of an internet portion upon which the present invention may be implemented.

A generalized diagram of a portion of an internet which the computer 56 controlled display terminal 57 used for Web page or other document display of the present invention is connected as shown in FIG. 2. Computer 56 and display terminal 57 are the computer system shown in FIG. 1 and connection 58 (FIG. 2) is the network connection shown in FIG. 1. Reference may be made to the above-mentioned text, *Mastering the Internet*, Cady et al., particularly at pp. 136–147, for typical connections between local display workstations to the internet via network servers any of which may be used to implement the system on which this invention is used. The system embodiment of FIG. 2 is one of these known as a host-dial connection. Such host-dial connections have been in use for over 30 years through network access servers 53 which are linked 51 to the net 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the internet 50 via linkage 51. In accordance with the present invention, the program in computer 56 operates to control the positioning of Web pages within windows in the display terminal in the manner to be hereinafter described in detail.

The present invention is preferably implemented on the Web browsers in combination with standard browser functions. Such standard browsers may be any of the Netscape browsers or the Microsoft Internet Explorer browsers. Since the invention relates to windows management functions, it may also be implemented in any windows management system or in a combination of a browser program in a windows system, e.g. Internet Explorer 3.0 in combination with Windows95.

Figure 3:
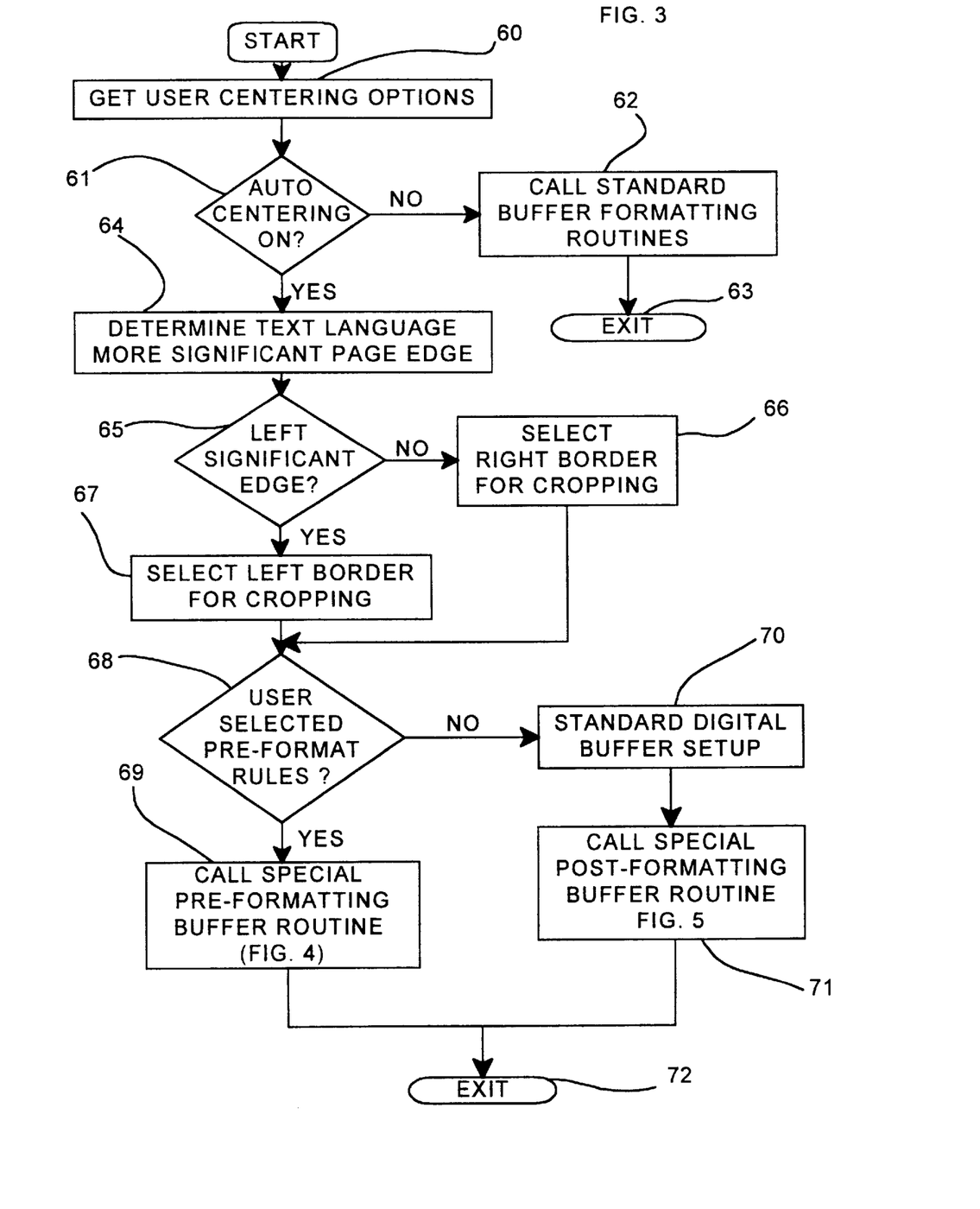
FIG. 3 is a flowchart of a process by which the present invention initializes a receiving display station to set up received document pages to be positioned with respect to a display window.

Embodiments of the invention will now be described with respect to the flowcharts of FIGS. 3 through 7. With respect to FIG. 3, a document with Web pages has been transmitted in HTML from the Internet (FIG. 2) to the receiving display station made up of computer 56 controlling display 57. The program starts to run, FIG. 3, with step 60 wherein options given to the user as to how the positioning of the pages may be modified is first determined. Some of the options which may be made available to the user are:

Shape text line by line at significant edge;
Select page line median centering;
Select page line mode centering;
Select % of line in each sampling step;
Shut off auto centering;
Select prepixel-array formatting or post-pixel array formatting.

These user options need only be set once by the user and then are retained as default choices or options for processing subsequent documents or Web pages. The user may choose to accept default (system provided) options and never set or reset these options or, at his discretion, change the options of each new Web page or document page. All of these options will be subsequently dealt with in greater detail. Next, a determination is made, step 61, as to whether the auto centering of page within window routine of the invention is on. If No, then under control of the window manager, the page is put into the display supporting buffer in the conventional manner, step 62, wherein the page is buffered in frame buffer 39 of FIG. 1. If Yes in step 61, the positioning process is commenced with step 64 by determining what will be the significant page edge which will serve as the reference edge from which the positioning will take place. This is usually determined by the natural language to be used in the final page display. In the present example with HTML transmissions, there is a coded indication of the language of the text being transmitted. Thus, if the language is one which reads from left to right, the more significant edge will be the left edge, and vice versa for languages which read from right to left. In this manner, decision step 65 determines whether the left border is to be cropped or centered from, step 67, or the right border is selected for cropping from, step 66. Then, step 68, a determination is made as to whether the user has selected to format the page positioning within the window according to prepixel-array stage rules, i.e. before the page is in a pixel-by-pixel array buffer or after the page has been digitized and thus buffered. If there is to be no prearray formatting, then, step 70, the page is set up in a standard pixel array buffer which could frame buffer 39 of FIG. 1 or an appropriate prebuffer, and the process proceeds with the post-array formatting routine, step 71, to be subsequently described with respect to FIG. 5. If the decision that the user has selected the prepixel array formatting, then the process proceeds to step 69 and, thus, to the programming routine of FIG. 4. It should be noted that in order to use the routine of FIG. 4, the received page has to have already "marked-up" format, such as in a hypertext markup language such as HTML or SGML (Standard Generalized Markup Language). Marked-up page formats give sufficient text line information from which the parameters needed to practice the invention may be derived without working with the data in pixel array format. On the other hand, if the received page is not so formatted and particularly if it contains images, the process to be described with respect to FIG. 5 should be used. At this point, the FIG. 3 process is exited, and the flow proceeds to either FIG. 4 or FIG. 5 as selected.

Figure 5:
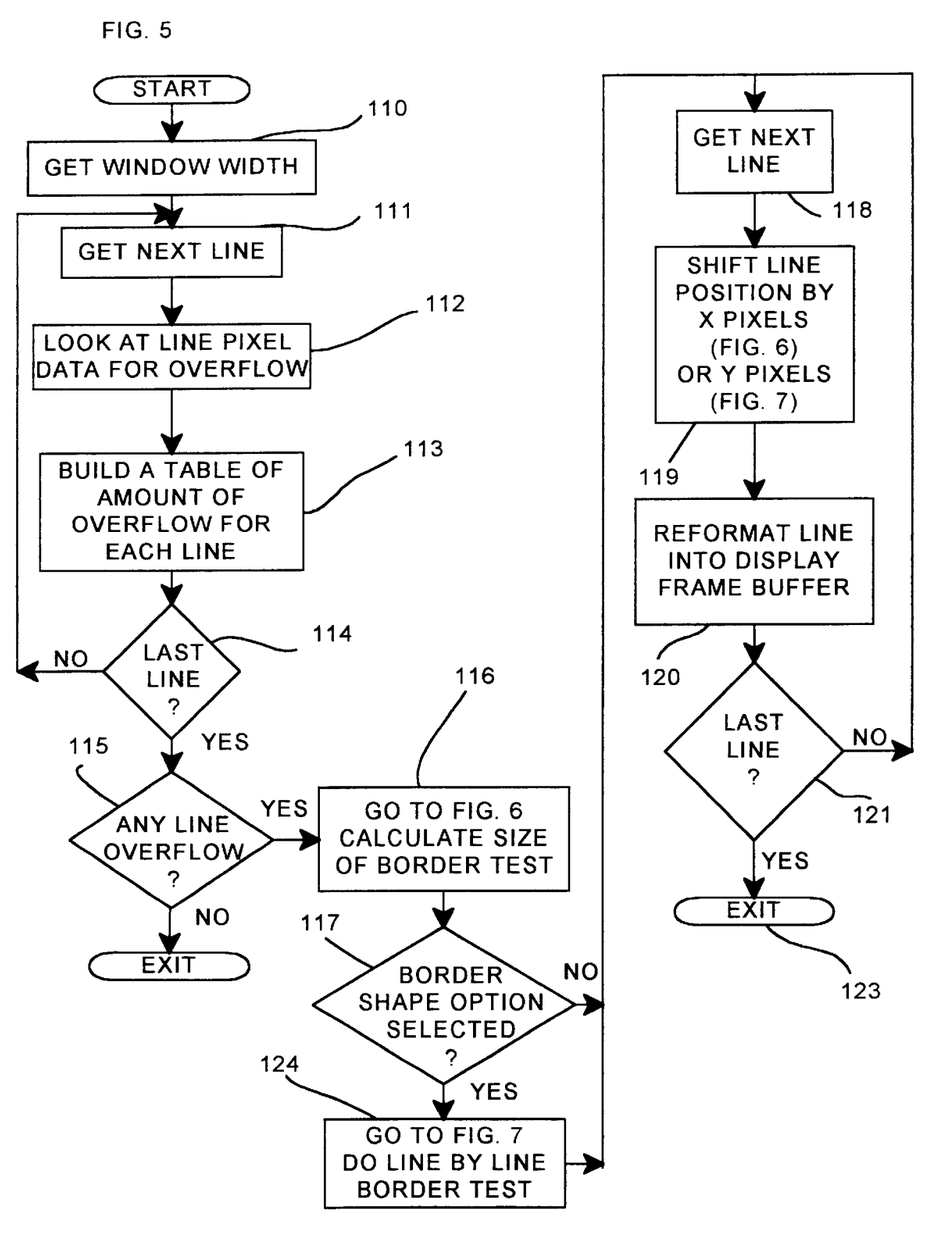
FIG. 5 is a flowchart of one embodiment of the present invention for page position through the processing of the digital data representative of a page after this data is formatted into a pixel array in a display buffer.

Let us first consider with respect to FIG. 5, how the received page is analyzed for positioning purposes. At this stage, the page is in an all points pixel array in a buffer. The width of the window within which the page is to be positioned is obtained, step 110. This information is available from the window management data in a window system such as Windows95. Then, the initial or next line in the page is obtained, step 111. The pixel data in the array representing the line is compared to the window width for overflow, step 112 and the overflow for the line is entered into a table, step 113. For each line, a determination is made as to whether it is the last line on the page, step 114. If not, then the flow is returned to step 111 and continued until all of the lines on the page are thus analyzed. At this point, step 115, a determination is made as to whether there is any overflow. If not, then no positioning or centering needs to be done and the process is exited. If there is overflow, then the process goes to the "calculate size of border" analysis to be described with respect to FIG. 6.

Figure 6:
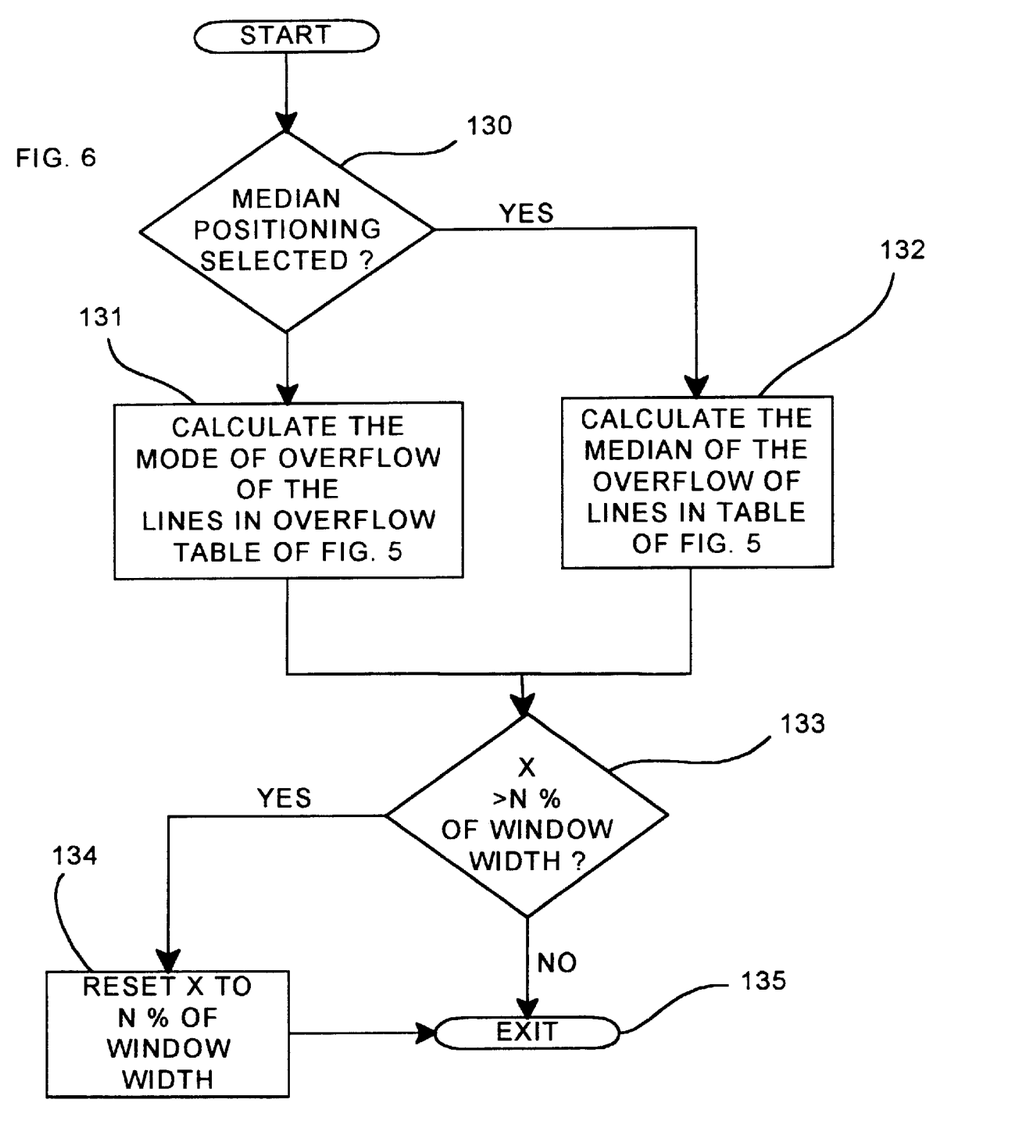
FIG. 6 is a subroutine of the program described in the flowchart of FIG. 5 for calculating the extent of the overflow of the width of the lines of data with respect to the width of the window within which the data is to be positioned.

Now with respect to FIG. 6, a determination is made as to whether the user has initially selected median positioning, step 130. If yes, then the median overflow of the overflow of all of the lines in the table, step 113 of FIG. 5 is calculated, step 132, in FIG. 6. If no, then the mode of these overflow lines is calculated, step 131. As previously noted, while median or mode calculations are used in the embodiments, any calculation of a mean value of overflow, such as average overflow, would be sufficiently effective. This mean value is designated as "X" and stored. Then a determination is made, step 133, as to whether X is greater than n% of the window width. Since the X value could be used in many cases as the distance which the lines on the page are shifted toward the significant edge in centering the page, this and its subsequent step are based on the recognition that if the mean overflow value is very great, it becomes impractical to shift for the whole distance. This would result in an overshifting rather than a centering of the page. Thus, the user is permitted to select n% of the window width which would represent the limit to which the lines would be so shifted. If the decision in step 133 is that X has exceeded this n% of window width, then, step 134, X is set at this n% limit which for most practical purposes is from about 5% to 15% of the window width. This limit value then is the X value which is stored and the routine is exited, step 135, back to FIG. 5 and step 117 where a determination is made as to whether a border shape option has been selected. This option has been described above as "line-by-line" text shaping. When this option is selected, the information of the page will retain its shape including tabs and indents at the significant page edge which serves as the reference. Otherwise, every line on the page will shift to reference margin without respect to indents. Thus, if the line by line border shape option is selected, the border shape will be retained but less information on the indented lines may appear since their length may exceed the window width. If the decision from step 117 is yes for the shaped border option, then a line-by-line shift value must be calculated, step 124, and the process moves to FIG. 7.

Figure 7:
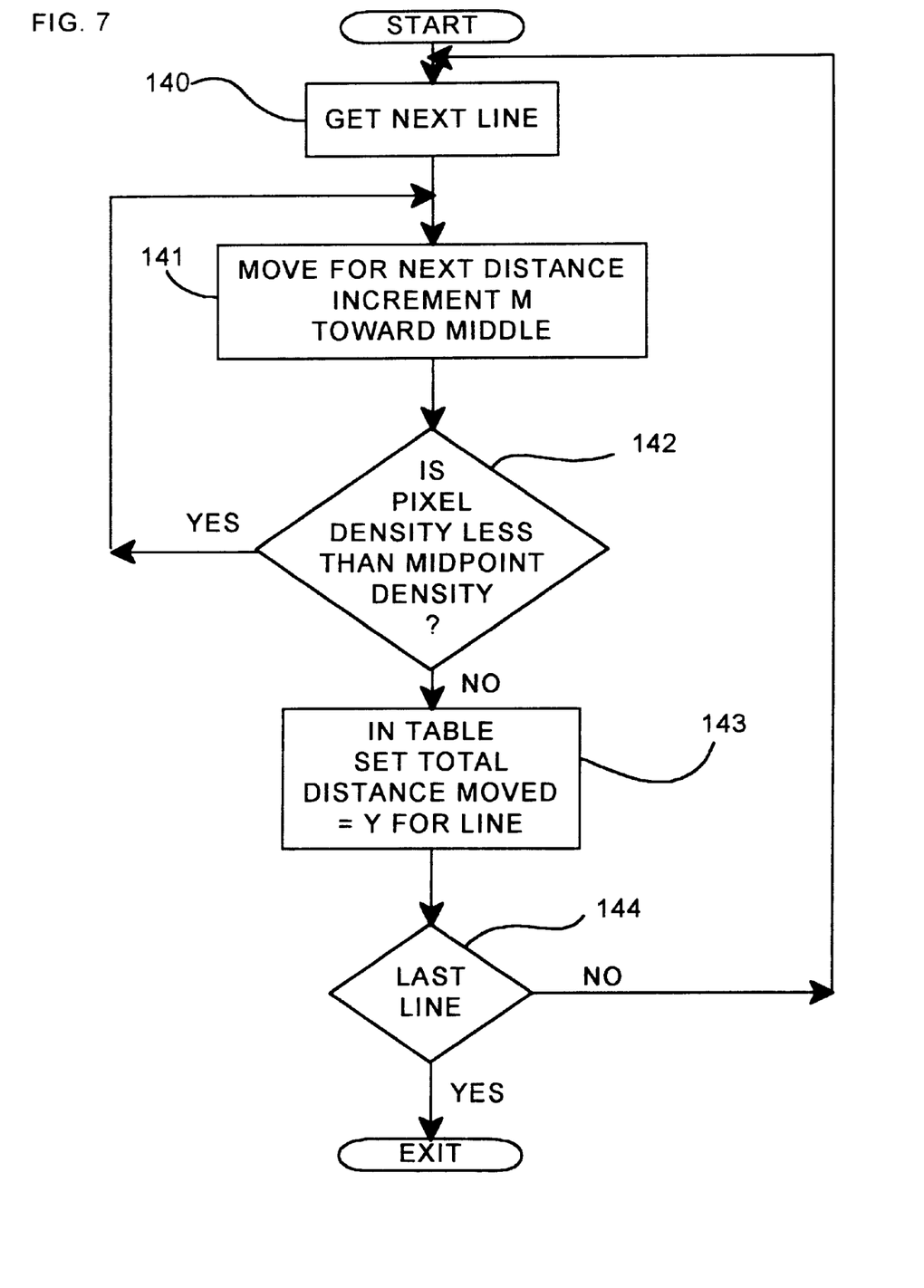
FIG. 7 is a subroutine of the program described in the flowchart of FIG. 5 selectable to create a positioned page with a reference border or margin which is staggered to reflect indents in the text on the page.

Starting with FIG. 7, the initial or next line of text is looked at in the pixel array in the buffer, step 140. First, step 141, the line will be sensed at a sequence of increments "M" along the line starting with the more significant page edge or border and moving toward the middle of the page. The initial increment is moved and a sensing or determination is made, step 142, as to whether the pixel density at that incremental position is still less that the pixel density at a comparison point in the midpoint of the line. Since the page is already in a pixel array, e.g., the frame buffer of FIG. 1, the display management portion of the windows operating system, of course, tracks the pixel density at the various line positions and may be sampled for the needs of the present program. Initially, the decision from step 142 should be yes since we are still in the page margin. In such a case, the process returns to step 141 wherein the sampling position is moved for the next M increment toward midpage. Since here we are dealing primarily with potentially indented text, the M increments may most conveniently be one text character wide. This loop back to step 141 from decision step 142 will continue until the density at the edge is no longer less than the midline density. At this point, the no decision results in step 143, the distance moved, i.e. the total number of M increments moved is set to equal "Y" for that line and recorded in a table. Now, a determination is made as to whether we are at the last line in the page, step 144. If no, the process loops back to step 140 and the above process is repeated for each line until the last line is reached. Thus, a yes decision from step 144 exits the program with the table of Y values set for use in the process of FIG. 5.

The process now returns to FIG. 5 wherein, irrespective of whether the border shaping option just described for FIG. 7 was selected in step 117 or not, the process proceeds to step 118 wherein the adjustment of the lines of the page will done. The initial or next line is obtained, step 118. Then, in step 119, the position of the line is shifted back toward the more significant edge or border of the page. If the border shaping option was selected in step 117, there will be a specific Y value for the line recorded in the table of step 143 of FIG. 7 and the line will be shifted by its Y value. If the shaping option was not chosen then the line will be shifted for the mean X value to be used for all of the lines on the page. In either case, the line will be reformatted in the display buffer, step 120, with either a shift of Y or X pixels toward the more significant page edge. Then a determination is made, step 121, as to whether this is the last line. If no, the process loops back to step 118 and the above process is repeated for each line until the last line is reached. Thus, a yes decision from step 144 exits the program with all of the lines on the page shifted in the frame buffer and the page more centered in accordance with the present invention.

Figure 4:
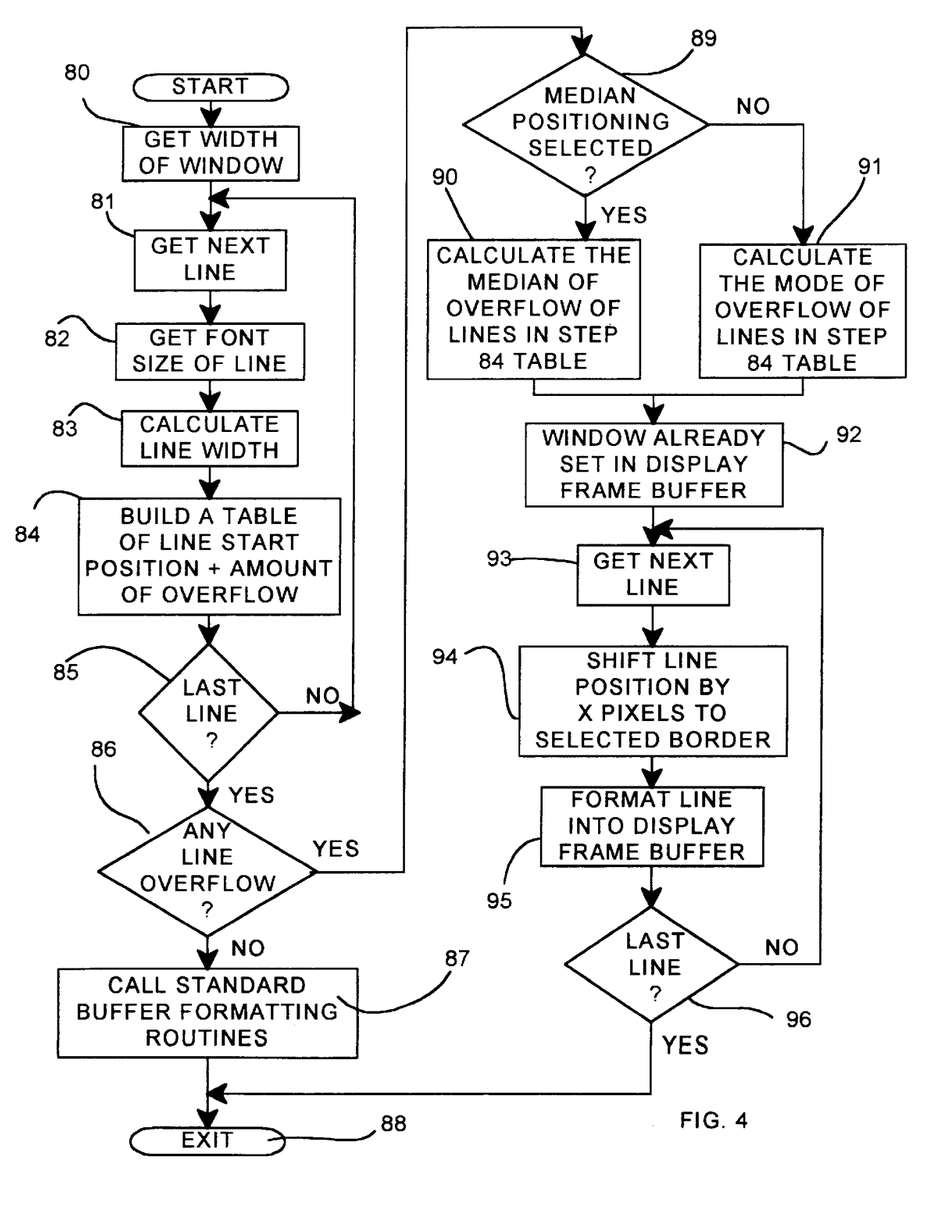
FIG. 4 is a flowchart of one embodiment of the present invention for page positioning through the processing of the digital data representative of a page before this data is formatted into a pixel array in a display buffer.

Now we will consider another embodiment of the present invention which arises if the decision made in step 68, FIG. 3, was that the user had selected the prepixel array formatting, then the process would proceed to step 69 and, thus, to the programming routine of FIG. 4. It should again be noted that in order to use the routine of FIG. 4, the received page has to already have "marked-up" format, such as in a hypertext markup language, i.e. HTML or SGML. It should be noted that marked-up page formats give sufficient text line information from which the parameters needed to practice the invention may be derived without the need to work with the data in pixel array format.

Let us first consider with respect to FIG. 4 how the received page is analyzed for positioning purposes. At this stage, the page has been received from the network via communications adapter 34, FIG. 1, and is being stored in its HTML format in RAM 14. The width of the window within which the page is to be positioned is obtained, step 80, FIG. 4. This information is available from the window management data in a window system such as Windows95. Then, the initial or next line in the page is gotten, step 81. The font size which is available from the HTML data is obtained, step 82, and then the width of the line is calculated with reference again to the HTML data, step 83. Now, step 84, the start position of the line on the page is obtained and, based upon the line width relative to the window width, the amount by which the line overflows the window is determined, and the starting position for the line, as well as the line overflow, is recorded in the table. For each line, a determination is made as to whether it is the last line on the page, step 85, and if not, then the flow is returned to step 81 and continued until all of the lines on the page are thus analyzed. At this point, step 86, a determination is made as to whether there is any overflow. If not, then no positioning or centering needs to be done, standard buffering rules will be applied, step 87, in reducing the page to its pixel array and putting the page into the display buffer, such as frame buffer 39 of FIG. 1, and the process is exited, step 88. If there is overflow, then the process goes to step 89 where a determination is made as to whether the user has initially selected median positioning. If yes, then, step 90, the median overflow of the overflow of all of the lines in the table of step 84 is calculated. If no, then the mode of these overflow lines is calculated, step 91. As previously noted, while median or mode calculations are used in the embodiments, any calculation of a mean value of overflow, such as average overflow, would be sufficiently effective. This mean value is designated as "X" and stored. At this point, we will proceed with the formatting of the page into a pixel array in the display buffer, e.g. frame buffer 39 of FIG. 1. Conventional formatting of the HTML data representative of the page into the pixel array representative of the same page will be used with the following modifications of this invention. The window within which the page is to be positioned, step 92, FIG. 4, is already in the frame buffer. The initial or next line is obtained, step 93. Then, in step 94, the position of the line is shifted back toward the more significant edge or border of the page. The line will be shifted for the mean X value stored above to be used for all of the lines on the page. The line will be reformatted in the display buffer, step 95, with a shift of X pixels toward the more significant page edge. Then a determination is made, step 96, as to whether this is the last line. If no, the process loops back to step 93 and the above process is repeated for each line until the last line is reached. Thus, a yes decision from step 96 exits the program with all of the lines on the page shifted in the frame buffer and the page more centered in accordance with the present invention.

Figure 4A:
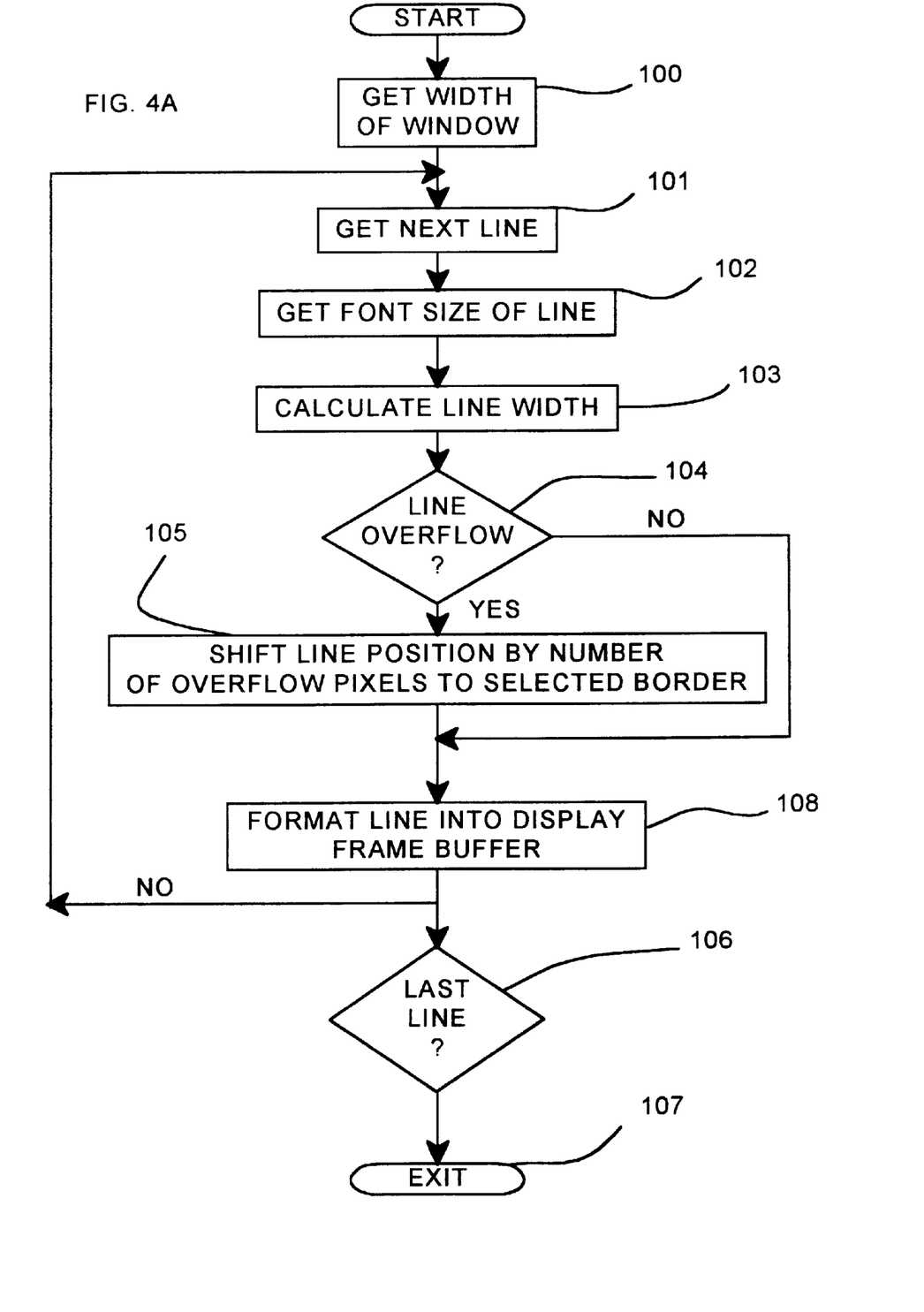
FIG. 4A is a flowchart of another embodiment of the present invention for page position through the processing of the digital data representative of a page before this data is formatted into a pixel array in a display buffer.

Now with respect to FIG. 4A, there will be described a variation of the program of FIG. 4 with received HTML or other formatted text for positioning the page while working with the coded HTML data. The program of FIG. 4A is simplified so that the overflow with respect to the window is calculated for each line on the page and that line is then formatted into pixels in the conventional manner but with the start of the line shifted towards the significant edge of the page by the distance of its overflow. In FIG. 4A, the received page is analyzed for positioning purposes. Here again, the page has been received from the network via communications adapter 34, FIG. 1, and is being stored in its HTML format in RAM 14. The width of the window within which the page is to be positioned is obtained, step 100, FIG. 4A. This information is available from the window management data in a window system such as Windows95. Then, the initial or next line in the page is gotten, step 101. The font size, which is available from the HTML data, is obtained, step 102, and then the width of the line is calculated with reference again to the HTML data, step 103. Next, a determination is made as to whether there is any overflow of the line with respect to window width. If not, then no positioning or centering needs to be done, standard buffering rules will applied, step 108, in reducing the line to its pixel array and putting the line into the display buffer such as frame buffer 39 of FIG. 1. If there is any overflow, then, in step 105, the position of the line is shifted back toward the more significant edge or border of the page by the amount of the overflow, after which the line will be formatted in the display buffer, step 108, with a shift of pixels toward the more significant page edge for the distance of the overflow. Then a determination is made, step 106, as to whether this is the last line. If no, the process loops back to step 101 and the above process is repeated for each line until the last line is reached. Thus, a yes decision from step 106 exits the program, step 107, with the lines on the page shifted in the frame buffer by the amount of the overflow and the page more centered in accordance with the present invention.

Although the preferred embodiments have been described with respect to positioning within windows, the invention is equally applicable to positioning of the pages within the whole display screen or any defined regions within the screen. Also, while the embodiments have been described relative to the lateral edges of a page, the invention would also be applicable to positioning relative to the vertical edges, i.e., the top and bottom edges of a page where an an appropriate advantage may be achieved by such positioning. One example of such an advantage would be if the the page text were in a language which was read vertically.

In addition, with the emergence of "set-top box" devices which turn conventional television sets into Web or Internet receiving display stations, there is even a greater likelihood that the Web pages will not be an optimum fit for the display and that postioning with respect to any page edge may be advantageous. The same may hold true for for the miniaturized screen or microscreen devices currently emerging, such as personal assistant devices.

Although certain preferred embodiments have been shown and described, it will be understood that many changes and modifications may be made therein without departing from the scope and intent of the appended claims.

What is claimed is:

1. In a data processor controlled user interactive display system for displaying in display screen windows documents, each comprising a sequence of at least one display screen page containing visual information including text, the improvement comprising:

means for determining a significant page edge, means for sampling a visual information density at a sequence of horizontal positions in a medial direction with respect to said more significant page edge, means for comparing each sequential sample of said visual information to a selected density level, and means responsive to said comparing means for positioning said visual information in said window with respect to a reference margin determined by a sample of said visual information attaining said selected density level.

2. The interactive display system of claim 1 further including:

means for storing digital representations of said screen pages, and wherein said means for sampling said visual information density samples said stored representations.

3. The interactive display system of claim 2 further including:

means for calculating a distance by which the width of a screen page exceeds the width of the window within which the page is to be displayed, and means for setting said sequence of horizontal sampling positions at increments of said distance.

4. The interactive display system of claim 3 wherein said means for sampling said information density sequentially samples the information along a plurality of horizontal lines, and said means for comparing compares each sequential sample on each of said plurality of lines to said selected density level, and further including means for calculating a mean horizontal position at which said selected density level is attained in said plurality of lines, said mean horizontal position being said reference margin.

5. In a computer managed communication network with user access via a plurality of data processor controlled interactive display stations and with a system for displaying in display screen windows documents transmitted to a receiving display station from locations remote from said stations, said documents including at least one display screen page containing visual information including text, the improvement wherein at least one of said display stations comprises:

means for determining a more significant page edge, means for sampling a visual information density at a sequence of horizontal positions in a medial direction with respect to said more significant page edge,     means for comparing each sequential sample of said visual information density to a selected density level, and     means responsive to said comparing means for positioning said visual information in said window with respect to a reference margin determined by a sample of said visual information attaining said selected density level.

6. The communications network of claim 5 wherein said receiving display station further includes:

means for storing digital representations of said screen pages, and     wherein said means for sampling said visual information density samples said stored representations.

7. The communications network of claim 6 wherein said receiving display station further includes:

means for calculating a distance by which the width of a screen page exceeds the width of the window within which the page is to be displayed, and     means for setting said sequence of horizontal sampling positions at increments of said distance.

8. The communications network of claim 7 wherein:

said means for sampling said information density sequentially samples the information along a plurality of horizontal lines, and     said means for comparing compares each sequential sample on each of said plurality of lines to said selected density level, and further including     means for calculating a mean horizontal position at which said selected density level is attained in said plurality of lines, said mean horizontal position being said reference margin.

9. The communications network of claim 8 wherein said screen pages are transmitted in a hypertext markup format and said means for storing the digital representations of said screen pages store said pages in said hypertext markup format.

10. The communications network of claim 8 wherein said receiving display station further includes a network browser comprising said sampling means, said comparing means and said positioning means.

11. In a computer implemented method for displaying in display screen windows documents, each comprising a sequence of at least one display screen page containing visual information including text, the improvement comprising:

determining a significant page edge, sampling a visual information density at a sequence of horizontal positions in a medial direction with respect to said significant page edge,     comparing each sequential sample of said visual information density to a selected density level, and     positioning said visual information in said window with respect to a reference margin determined by a sample of said visual information attaining said selected density level in said comparing step.

12. The method of claim 11 further including the step of storing digital representations of said screen pages, and     wherein said sampling of visual information density samples said stored representations.

13. The method of claim 12 further including the steps of calculating a distance by which the width of a screen page exceeds the width of the window within which the page is to be displayed, and     setting said sequence of horizontal sampling positions at increments of said distance.

14. The method of claim 13 wherein said step of sampling said information density sequentially samples the information along a plurality of horizontal lines, and     said comparing step compares each sequential sample on each of said plurality of lines to said selected density level, and further including the step of     calculating the mean horizontal position at which said selected density level is attained in said plurality of lines, said a horizontal position being said reference margin.

15. In a computer managed communication network with user access via a plurality of data processor controlled interactive display stations and with a system for displaying in display screen windows documents transmitted to said display stations from locations remote from said stations, said documents including at least one display page containing visual information including text, a method for positioning said pages in said windows in a display station receiving the transmitted documents comprising:

determining a more significant page edge, sampling the visual information density at a sequence of horizontal positions in a medial direction with respect to said more significant page edge,     comparing each sequential sample of said visual information density to a selected density level, and     positioning said visual information in said window with respect to a reference margin determined by a sample of said visual information attaining said selected density level in said comparing step.

16. The method of claim 15 further including the step of:

storing digital representations of said screen pages, and     wherein said step of sampling said visual information density samples said stored representations.

17. The method of claim 16 further including the steps of:

calculating a distance by which the width of a screen page exceeds the width of the window within which the page is to be displayed, and     setting said sequence of horizontal sampling positions at increments of said distance.

18. The method of claim 17 wherein said step of sampling said information density sequentially samples the information along a plurality of horizontal lines, and     said comparing step compares each sequential sample on each of said plurality of lines to said selected density level, and further including the step of     calculating a mean horizontal position at which said selected density level is attained in said plurality of lines, said mean horizontal position being said reference margin.

19. The method of claim 18 wherein said screen pages are transmitted and stored in a hypertext markup format.

20. The method of claim 19 further including a network browsing method carried out on said receiving display station, said browsing method including said sampling, comparing and positioning steps.

21. In a computer program having data structures included on a computer readable medium for displaying in display screen windows documents, each comprising at least one display screen page containing visual information including text, the improvement comprising:

means for determining a significant page edge, means for sampling the visual information density at a sequence of horizontal positions in a medial direction with respect to said more significant page edge, means for comparing each sequential sample of said visual information density to a selected density level, and means responsive to said comparing means for positioning said visual information in said window with respect to a reference margin determined by a sample of said visual information attaining said selected density level.

22. The computer program of claim 21 further including:

means for storing digital representations of said screen pages, and wherein said means for sampling said visual information density samples said stored representations.

23. The computer program of claim 22 further including:

means for calculating a distance by which the width of a screen page exceeds the width of the window within which the page is to be displayed, and means for setting said sequence of horizontal sampling positions at increments of said distance.

24. The computer program of claim 23 wherein:

said means for sampling said information density sequentially samples the information along a plurality of horizontal lines, and said means for comparing compares each sequential sample on each of said plurality of lines to said selected density level, and further including means for calculating a mean horizontal position at which said selected density level is attained in said plurality of lines, said mean horizontal position being said reference margin.

25. In a computer program having data structures included on a computer readable medium for browsing a computer managed communication network via a data processor controlled user interactive receiving display station in order to display in display windows in said receiving display station, documents including a sequence of at least one display screen page containing visual information including text, the improvement comprising:

means for determining a significant page edge, means for sampling the visual information density at a sequence of horizontal positions in a medial direction with respect to said more significant page edge, means for comparing each sequential sample of said visual information density to a selected density level, and means responsive to said comparing means for positioning said visual information in said window with respect to a reference margin determined by a sample of said visual information attaining said selected density level.

26. The computer program of claim 25 further including:

means for storing digital representations of said screen pages, and wherein said means for sampling said visual information density samples said stored representations.

27. The computer program of claim 26 further including:

means for calculating the distance by which the width of a screen page exceeds the width of the window within which the page is to be displayed, and means for setting said sequence of horizontal sampling positions at increments of said distance.

28. The computer program of claim 27 wherein said means for sampling said information density sequentially samples the information density along a plurality of horizontal lines, and said means for comparing compares each sequential sample on each of said plurality of lines to said selected density level, and further including means for calculating a mean horizontal position at which said selected density level is attained in said plurality of lines, said mean horizontal position being said reference margin.

29. The computer program of claim 28 wherein said screen pages are transmitted in a hypertext markup format and said means for storing the digital representations of said screen pages store said pages in said hypertext markup format.

* * * * *